United States Patent [19]
Ott

[11] Patent Number: 5,876,013
[45] Date of Patent: Mar. 2, 1999

[54] VIBRATION DAMPENING ENGINE MOUNT

[76] Inventor: Vern D. Ott, 1839 Rte. 746 South, Cardington, Ohio 43315

[21] Appl. No.: 602,370

[22] Filed: Feb. 16, 1996

[51] Int. Cl.$^6$ .................................................. F16M 11/00
[52] U.S. Cl. ........................... 248/674; 180/228; 248/635
[58] Field of Search ................................... 248/635, 638, 248/647, 317, 674, 560; 180/299, 300, 219, 228, 312

[56] References Cited

U.S. PATENT DOCUMENTS

| | | | |
|---|---|---|---|
| 1,606,966 | 11/1926 | Smith-Clarke . | |
| 1,968,040 | 7/1934 | Houdek | 248/14.2 |
| 3,289,781 | 12/1966 | Ferguson | 180/64 |
| 3,622,194 | 11/1971 | Bryk | 296/35 |
| 3,783,961 | 1/1974 | Hooper | 180/228 |
| 4,323,135 | 4/1982 | Tominaga et al. | 180/228 |
| 5,109,943 | 5/1992 | Crenshaw et al. | 180/228 |
| 5,570,753 | 11/1996 | Carlini | 180/300 |

*Primary Examiner*—Ramon O. Ramirez
*Assistant Examiner*—Willie Berry, Jr.
*Attorney, Agent, or Firm*—Kremblas, Foster, Millard & Pollick

[57] ABSTRACT

An engine mount for reducing the transmission of vibration from the engine to the frame. A beam has slots in the ends through which mounting bolts extend to fasten the beam to the engine heads. An L-shaped bracket extends laterally away from and upwardly from the beam. A mounting frame member is sandwiched between a pair of urethane bushings, and the L-shaped bracket and a rigid plate compress the bushings around the frame member.

6 Claims, 8 Drawing Sheets

VIBRATION DAMPENING ENGINE MOUNT

TECHNICAL FIELD

This invention relates broadly to the field of engine mounts, and more specifically relates to the field of top engine mounts for HARLEY DAVIDSON brand two-cylinder engines, for dampening vibrations normally transmitted from the engine to the motorcycle frame.

BACKGROUND ART

Figure 1:
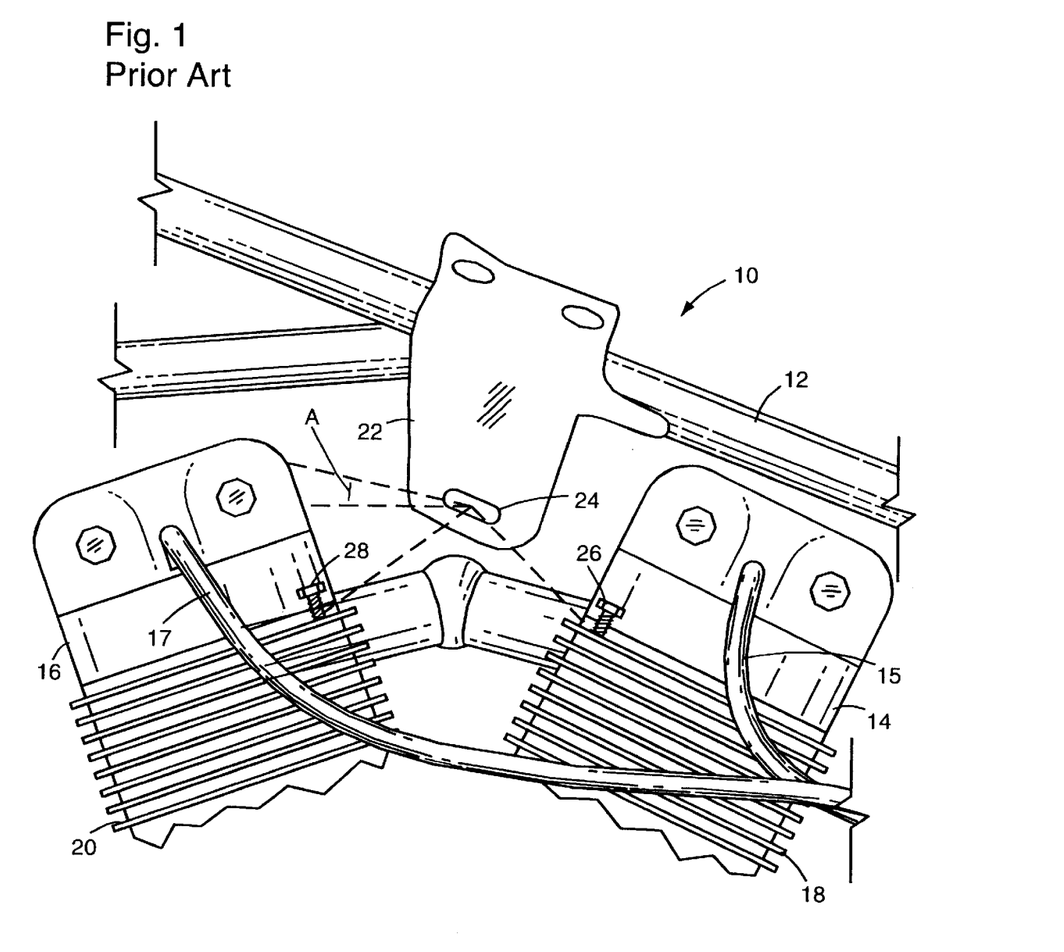
FIG. 1 a side view illustrating the location of the prior art engine mount.

HARLEY DAVIDSON brand motorcycles come from the manufacturer equipped with a top engine mount made of stamped steel which connects the top of the engine to the motorcycle frame. FIG. 1 illustrates the typical configuration of the motorcycle 10, having a frame 12 and a pair of engine heads 14 and 16. Spark plug wires 15 and 17 attach to the spark plug (not visible in FIG. 1) in each head and the heads are fastened to air cooled blocks 18 and 20 by a plurality of bolts.

A frame member 22, having a slot 24 formed near its lower edge, extends downwardly from the tubular frame 12, and the slot 24 is angled slightly from horizontal (A). The original stamped engine mount bolts to the slot 24 and extends downwardly and outwardly in an inverted "T-shape", one leg of which fastens to the head 14 at the bolt 26, and the other leg of which fastens to the head 16 at the bolt 28. This configuration is disadvantageous in that it transmits a substantial portion of the vibration from the motorcycle engine to the frame 12 on which the operator sits. Because the two cylinder motorcycle engine is particularly susceptible to vibration, an uncomfortable seating environment exists for the operator, and other motorcycle parts often are loosened from their mount by this vibration.

The need exists for a vibration dampening engine mount which maintains the engine in position as required, but which reduces the vibrations felt by the operator.

BRIEF DISCLOSURE OF INVENTION

The invention is a vibration dampening engine mount. The mount comprises a beam rigidly fastened to the engine, extending to, and clampingly engaging a frame member between a pair of elastomeric bushings.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

Figure 2:
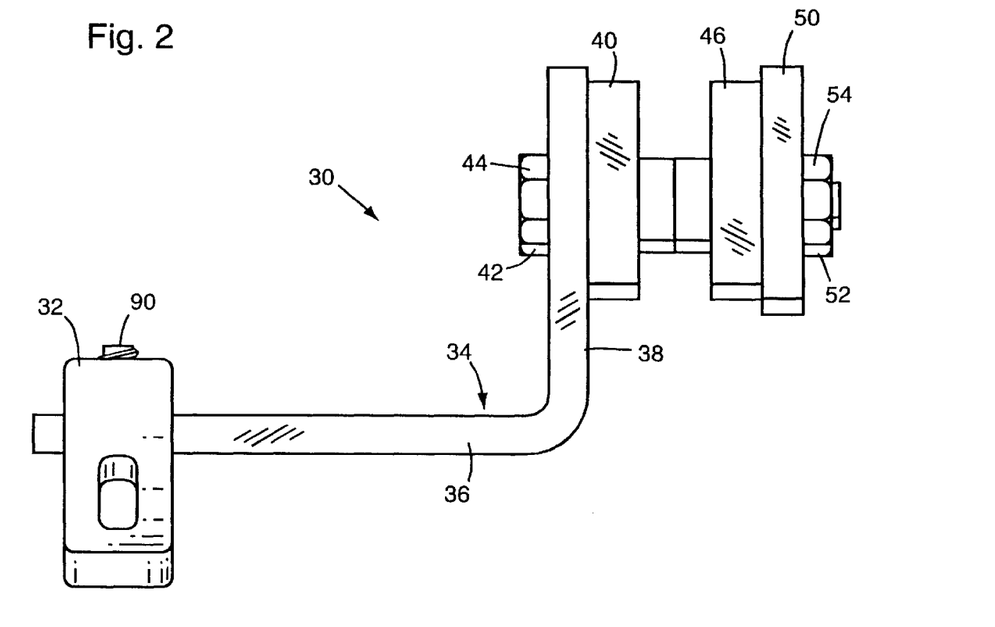
FIG. 2 is a side view of a moter mount illustrating the preferred embodiment, of the present invention.

The preferred engine mount 30 shown in FIG. 2 includes a beam 32 extending in opposite directions from central rigid attachment to an "L-shaped" bracket 34. The bracket 34 extends away from the beam 32 with a lower leg 36 and upwardly from the lower leg 36 with an upper leg 38. A first bushing 40 is mounted to the upper leg 38 by the bolts 42 and 44 extending longitudinally through holes formed in the upper leg 38 and holes formed in the bushing 40. A second bushing 46, which is a mirror image of the bushing 40, is mounted to the bushing 40 by the bolts 42 and 44 extending through holes in the bushing 46. A rigid plate 50 sandwiches the bushings 40 and 46 between the plate 50 and the upper leg 38, and the bolts 42 and 44 extend through the rigid plate 50. Nuts 52 and 54 attach to the ends of the bolts 42 and 44, respectively, to clamp the plate 50 and upper leg 38 around the bushings 40 and 46.

Figure 3:
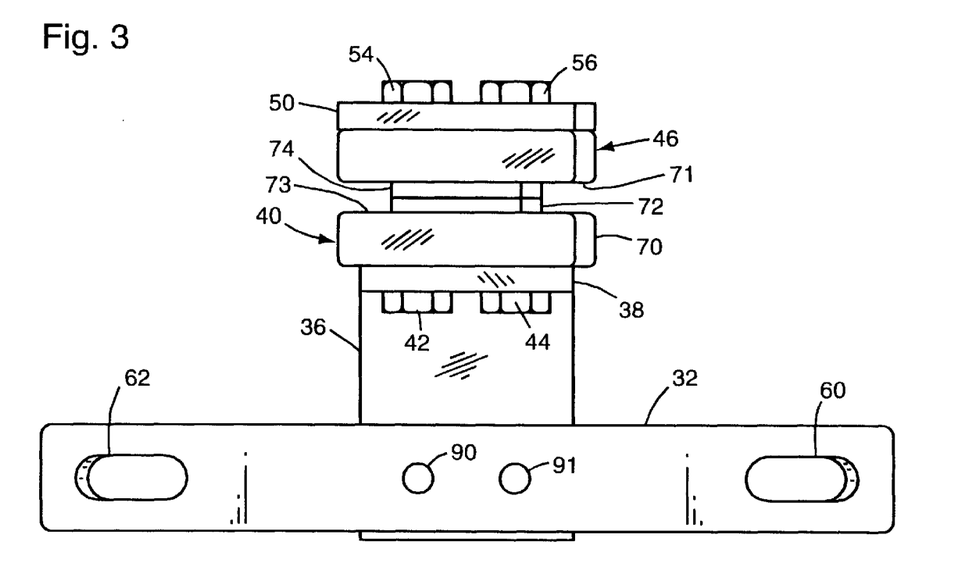
FIG. 3 is a top view of the moter mount of FIG. 2.
Figure 4:
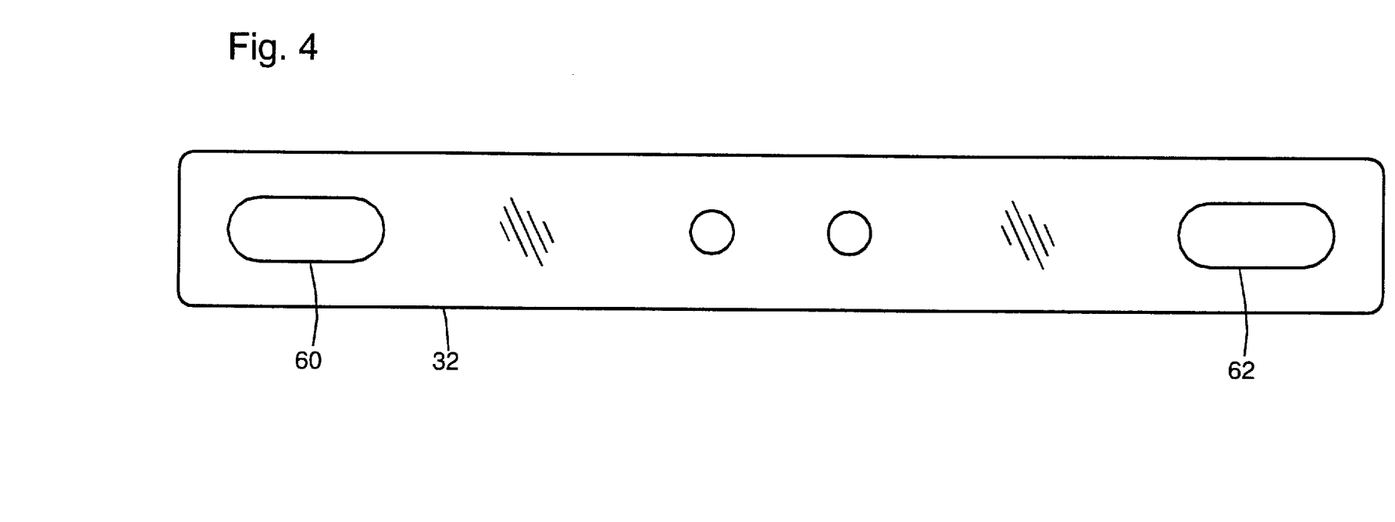
FIG. 4 is a top view illustrating a beam.
Figure 5:
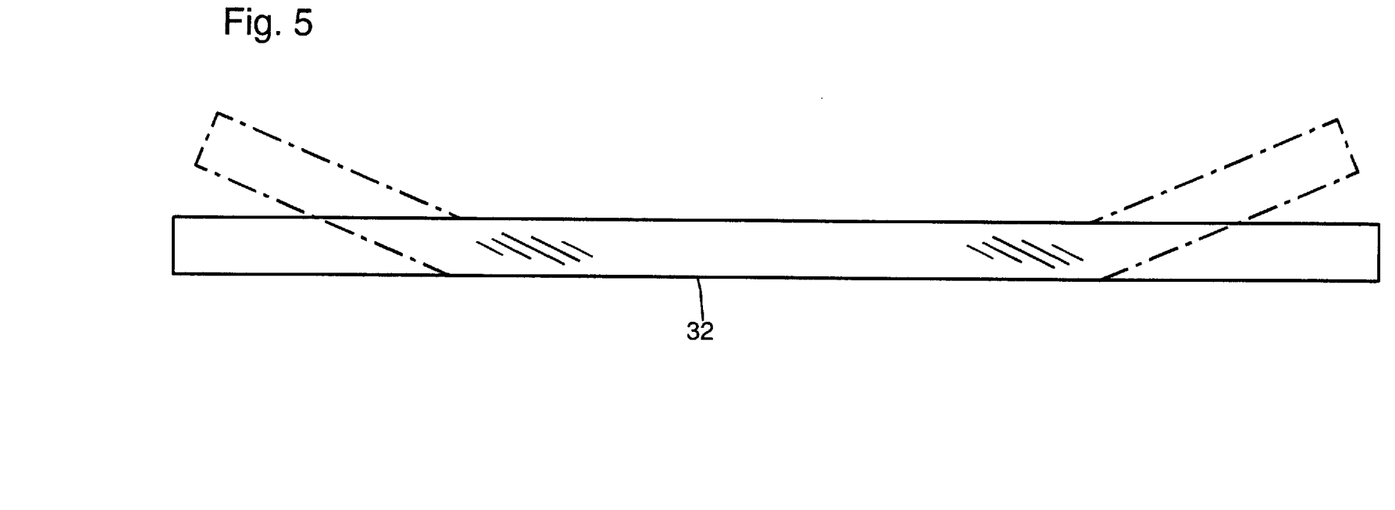
FIG. 5 is an end view illustrating the beam of FIG. 4.

The relative length of the beam 32 is more easily seen in FIG. 3, which also shows the slots 60 and 62 formed through the beam 32. FIGS. 4 and 5 show the 22½ degree bends formed on the beam 32 four inches apart, and each bend is spaced two inches from the longitudinal center of the beam 32. The beam 32 is preferably 8 inches long prior to bending, with the slots 60 and 62 extending through the beam 32 near opposite ends.

Figure 6:
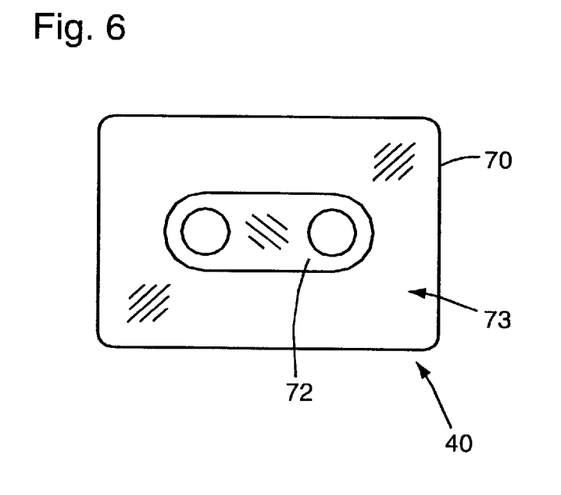
FIG. 6 is a side view illustrating a bushing.
Figure 7:
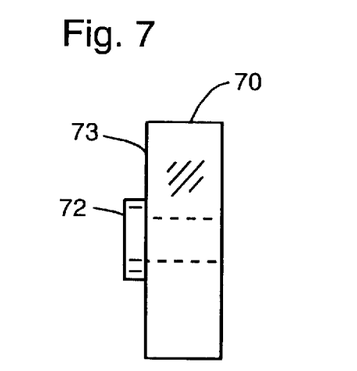
FIG. 7 is an end view illustrating the bushing of FIG. 6.

Referring to FIGS. 6 and 7, the bushing 40, of which the bushing 46 is an identical copy, has a thick, generally planar body 70 with a shoulder 72 extending 0.15 inches from the face 73. The peripheral edge of the shoulder 72 is spaced approximately ½ inch inwardly from the peripheral edge of the face 73. A pair of holes is formed through the bushing 40, extending perpendicularly through both the shoulder 72 and the body 70.

Figure 15:
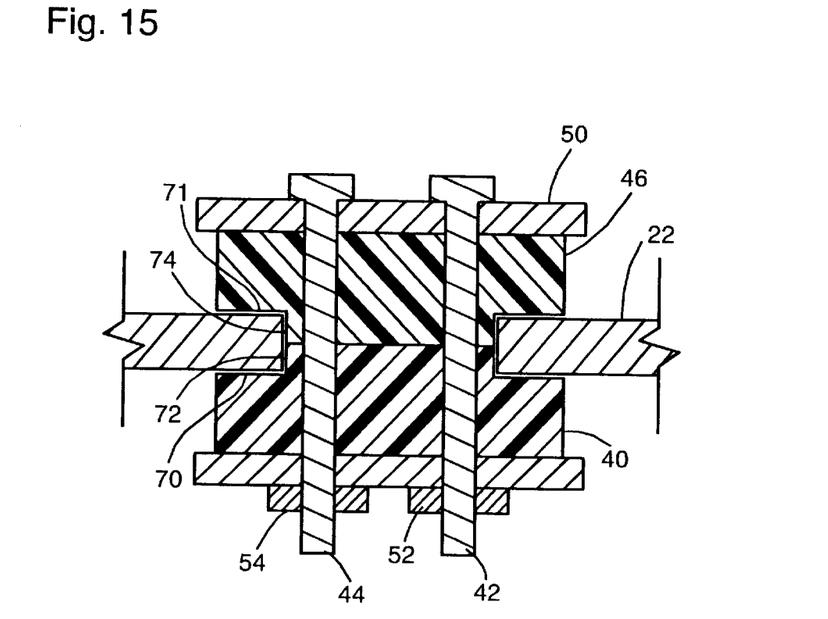
FIG. 15 is a view in section through the line 15—15 of FIG. 13.

The shoulder 72 of the bushing 40, and the similarly shaped shoulder 73 of the bushing 46, are made to have a thickness of 0.15 inches, since this has a relationship with the thickness of the frame member 22 shown in FIG. 1. Referring to FIG. 15, each shoulder 72 and 74 appears to be approximately one-half the thickness of the frame member 22, but are actually slightly less than one-half the thickness of the frame member 22. This is so that upon sandwiching the frame member 22 between the bushings 40 and 46, the planar body 70, and the corresponding planar body 71 of the bushing 46 will seat directly against the frame member 22. Were the shoulders 72 and 74 made significantly thicker, it is possible that their presence would prevent the seating of the planar bodies 70 and 71 directly against the opposing faces of the frame member 22.

Figure 8:
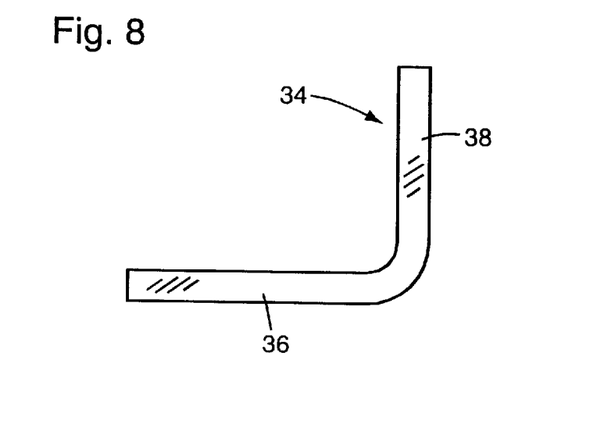
FIG. 8 is a side view illustrating a bracket.
Figure 9:
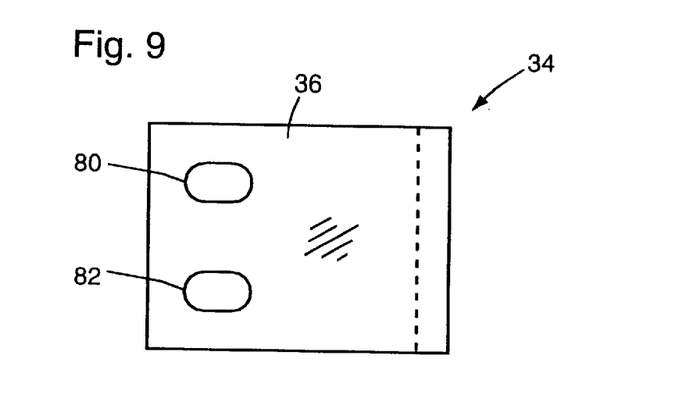
FIG. 9 is a front view illustrating the bracket of FIG. 8.
Figure 10:
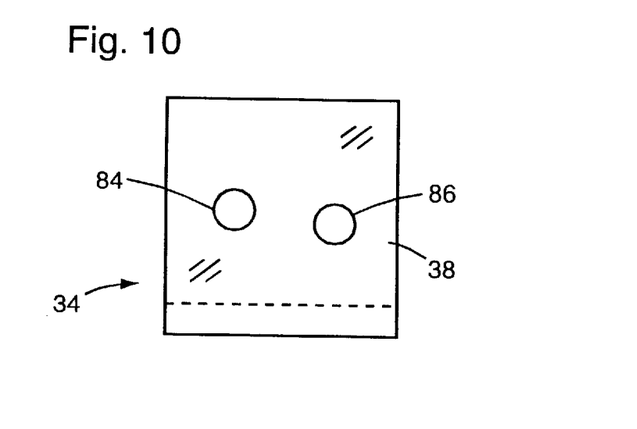
FIG. 10 is a bottom view illustrating the bracket of FIG. 2.

The bracket 34, shown in FIGS. 8, 9 and 10, has a lower leg 36 with a length of 2.38 inches and an upper leg 38 with a length of 1.88 inches. A pair of slots 80 and 82 are formed through the lower leg 36, and a pair of holes 84 and 86 are formed through the upper leg 38. The holes 84 and 86 are offset by approximately ¹⁄₁₀ of an inch to accommodate the angle from horizontal of the slot 24 shown in FIG. 1(A). The slots 80 and 82 of the lower leg 36 are the passageways through which the bolts 90 and 91 (best seen in FIG. 3) extend to mount the lower leg 36 to the beam 32. The slots 80 and 82 are longer than the diameter of the bolts 90 and 91, providing adjustability in the mounting of the bracket 34 to the beam 32, thus providing for variations in engine mount position.

Figure 11:
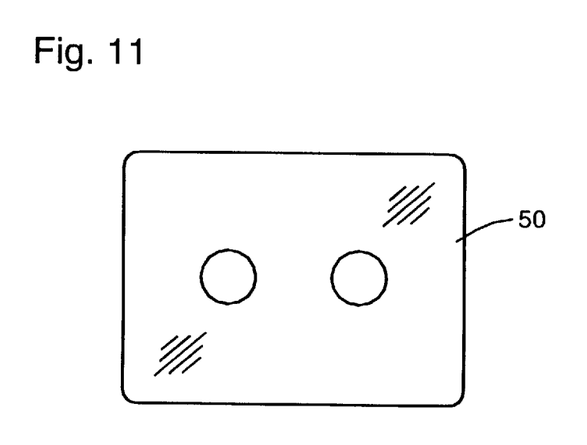
FIG. 11 is a side view illustrating a rigid plate.
Figure 12:
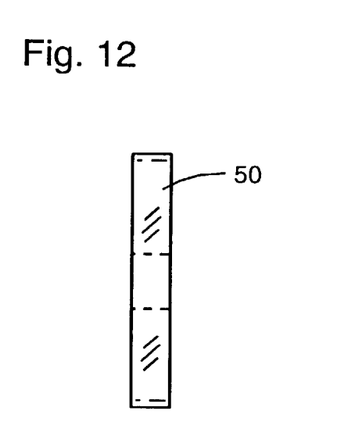
FIG. 12 is an end view illustrating the rigid plate of FIG. 11.

The rigid plate 50 shown in FIGS. 11 and 12 has holes drilled 0.875 inches apart at the center. The rigid plate 50 has a thickness of ¼ inch.

Figure 13:
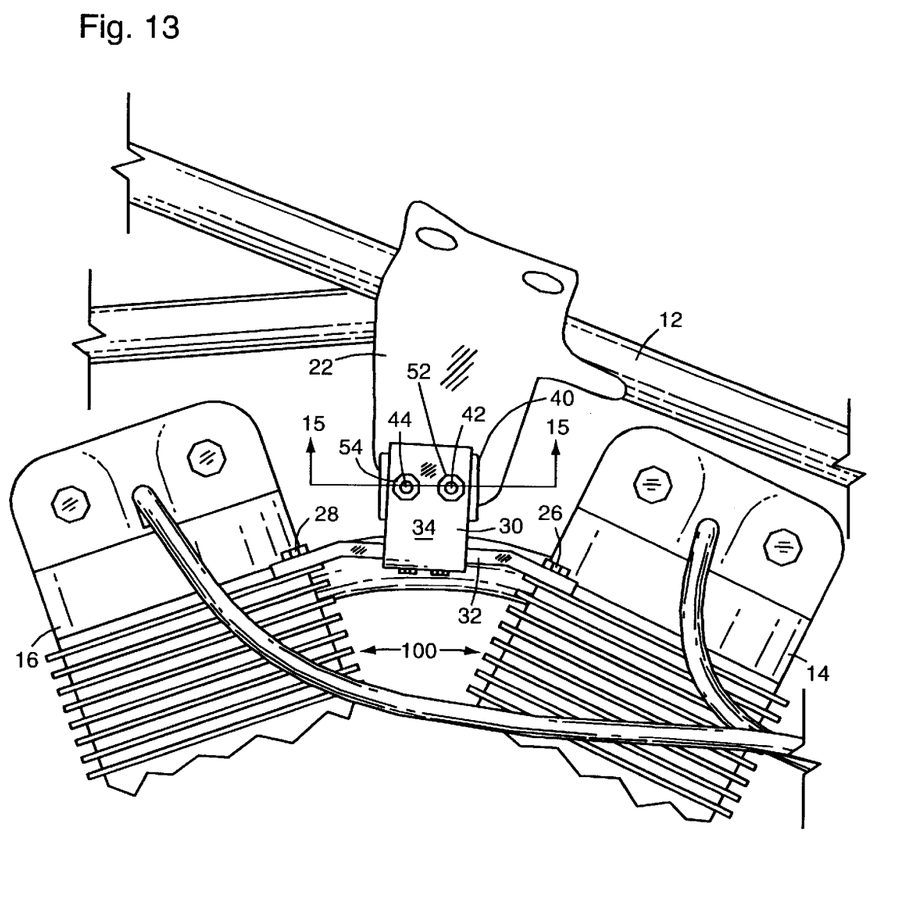
FIG. 13 is a side view illustrating the preferred embodiment of the present invention mounted in its operable position.
Figure 14:
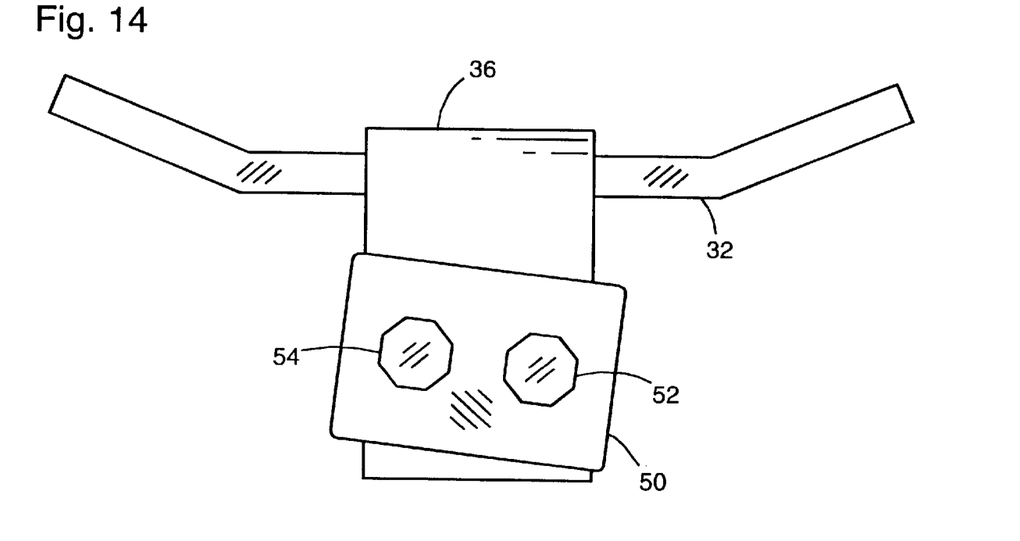
FIG. 14 is an end view of the mater mount of FIG. 2.

The engine mount 30 is shown in its preferred operable position in FIG. 13, with the beam 32 mounted to the heads 14 and 16 by bolts 26 and 28, and with the frame member 22 sandwiched between the bushings 40 and 46. The nuts 52 and 54 are tightened in the preferred embodiment to approximately 180 inch pounds of torque, thus clamping the frame member 22. The bolts 26 and 28 are preferably tightened to 40 foot pounds of torque.

When the nuts 52 and 54 are tightened on the bolts 42 and 44, the bushings 40 and 46 are compressed a specific amount to pre-load the bushings 40 and 46. This pre-loading of the bushings 40 and 46 makes them somewhat harder due to an increased spring constant, k, of the bushings 40 and 46, which results in a greater force necessary to deform them. Although this increases the felt vibrations at lower rpms, this compression (in combination with the characteristics of the material) make the vibration felt at higher, more common engine speeds more comfortable for the rider and better for decreasing the vibration-loosening of other mounted parts. The material and the compression thereof has been tailored to transmit the least vibration, which makes the motorcycle the most comfortable, at the engine speed at which most people ride most often. This engine speed is approximately 3500 revolutions per minute and about 70 miles per hour highway speed.

Referring again to FIG. 13, when the engine is operating the beam 32 and the bracket 34, which are rigid bodies, are displaced rapidly by the heads 14 and 16 in the directions of the arrow 100, which causes the beam 32 to oscillate generally about the bolts 42 and 44. Referring back again to FIG. 15, the bushings 40 and 46, which clampingly engage the frame member 22, deform as the forces are applied back and forth to the bushings 40 and 46 by the bracket 34, the bolts 42 and 44, and the rigid plate 50. This deformation of the material of the bushings 40 and 46 absorbs a substantial amount of the energy being transmitted to the bushings 40 and 46, thus reducing the vibration transmitted to the frame 12. This vibration reduction occurs due to the characteristics of the material selected for the bushings 40 and 46 and the shape of the bushings 40 and 46, which insulates all rigid parts from the frame member 22.

The bushings 40 and 46 have a Durometer Hardness on the Shore D Scale of between 15 and 70 at the outside range, with 48 to 50 being the preferred range. This material also has a Recovery Delay of between 0.3 and 2 seconds at the outside range, with the preferred amount being about one second. The material from which the bushings 40 and 46 are made is a low stoichiometry polyether-based urethane, utilizing biuret cross-linking. This cross-linking is disturbed during the cure cycle by a complex alcohol reaction on the double bonds, causing asymmetrical ring cross-links of a special nature; that is, they exhibit deformation. This structure detracts little from the desired mechanical hardness, but shows improved energy dissipation under the dynamic mechanical deformation experienced in the preferred embodiment.

The characteristics of this material and the shape of the bushings 40 and 46 make the bushings 40 and 46 absorb the energy which would normally be transmitted to the frame 12 by a rigid member. The energy dissipation of the bushings 40 and 46 make them a low efficiency spring, unlike a metal coil spring and the like. The low efficiency means vibrations that would normally be transmitted to the frame are deadened by the energy absorption of the bushings 40 and 46.

Although only an engine mount for a horizontal slot 24 has been illustrated and described, it will become apparent to a person of ordinary skill in the art from the present description that a similar device for a vertical slot or an otherwise similarly shaped aperture can be devised embodying the principles of the present invention.

While certain preferred embodiments of the present invention have been disclosed in detail, it is to be understood that various modifications may be adopted without departing from the spirit of the invention or scope of the following claims.

I claim:
1. A vibration dampening engine mount which mounts a pair of engine heads to a frame, comprising:
   (a) a beam, adapted to be mounted to the heads;
   (b) a bracket, mounted to the beam and extending from the beam toward the frame, said bracket being mounted to said beam such that said beam extends in opposite directions from said bracket;
   (c) a first bushing clamped between the bracket and the frame; and
   (d) a second bushing clamped on an opposite side of the frame as the first bushing.
2. An mount in accordance with claim 1, wherein the bushings are elastomeric.
3. The mount of claim 1 wherein said frame includes a slot and each bushing includes a shoulder projecting into said slot,
   each said shoulder abutting the other shoulder within said slot.
4. The mount of claim 3 wherein said first bushing is clamped between said bracket and said frame by a pair of bolts extending through aligned openings in a rigid plate, said two bushings, said two shoulders, said frame slot and said bracket to threadedly engage a pair of nuts.
5. The mount of claim 4 wherein nuts are tightened on said bolts to compress said bushings into tight engagement with said bracket on each side of said frame in the area circumscribing said slot.
6. The mount of claim 5 wherein said slot is inclined from the horizontal by a few degrees, said beam being mounted generally parallel with said slot, said beam terminating in downwardly deflected tips, said tips each being configured to be connected to and support one of said engine heads.

* * * * *